United States Patent
Bergmark et al.

[11] 3,921,657
[45] Nov. 25, 1975

[54] FIRE DAMPER DEVICE

[75] Inventors: Nils Randolf Bergmark, Byske; Karl-Gunnar Torbjorn Johansson, Ersmark, both of Sweden

[73] Assignee: Futurum; erken AB, Byske, Sweden

[22] Filed: Sept. 4, 1974

[21] Appl. No.: 503,080

[30] Foreign Application Priority Data
Sept. 12, 1973 Sweden.............................. 7312425

[52] U.S. Cl.................................. 137/75; 137/527
[51] Int. Cl.²......................................... F16K 17/38
[58] Field of Search...................... 98/86; 126/287.5; 137/72–77, 457, 520, 521, 525.5, 527–527.8; 251/303

[56] References Cited
UNITED STATES PATENTS

| 182,355 | 9/1876 | Campbell | 137/527 |
| 364,206 | 6/1887 | Baltzley | 137/527.8 |
| 1,110,269 | 9/1914 | Moynihan | 137/75 |
| 2,181,961 | 12/1939 | Bingham | 137/72 |

FOREIGN PATENTS OR APPLICATIONS

| 29,995 | 6/1884 | Germany | 137/527 |
| 2,140,805 | 1/1973 | France | 137/75 |
| 2,110,643 | 9/1971 | Germany | 137/75 |

Primary Examiner—Henry T. Klinksiek
Assistant Examiner—Richard Gerard
Attorney, Agent, or Firm—Cushman, Darby & Cushman

[57] ABSTRACT

An automatic fire damper device comprising a pipe section in which a flap valve is held adjacent the pipe wall in the inactive position by a spot of melting metal at its lower end and by a tensioned flat spring at its upper end. Hot fire gases in the pipe melt the metal allowing the spring to swing the valve flap upwards in the pipe so that its bottom edge engages the opposite pipe wall, blocking the pipe flow area. For a circular pipe, the flap is curved and oval-shaped in projection.

6 Claims, 3 Drawing Figures

U.S. Patent  Nov. 25, 1975  3,921,657

FIRE DAMPER DEVICE

In ventilation canals and the like it is a desire to be able to cut off the flow area to prevent a potential fire spreading through the canals. The object of the present invention is to provide an automatically operating fire damper device which will be simple and cheap in manufacture and assembly, have small outer dimensions and as little as possible affect the air current through the canal in a normal inactive position. The invention especially relates to such a fire damper device suitable for erecting in an evacuation canal from a kitchen, e.g. from a kitchen ventilator.

According to the invention this task is solved by a fire damper device arranged automatically to close the canal when hot gas flow through it, characterized by a pipe section intended for mounting in the canal, and a valve flap which in the inactive position follows the inner wall of the pipe section and is attached to it by a pretensiond spring and a fastening means made as a melting fuse, which melts under the influence of hot gases in the canal, thereby allowing the spring to put the flap into a closing position cutting off substantially the whole of the canal flow area.

Figure 1:
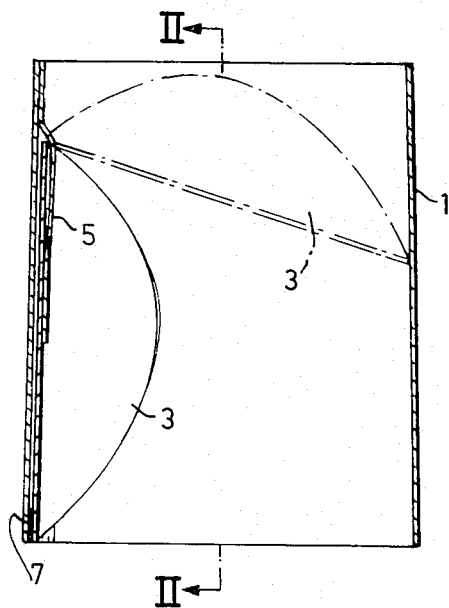
Figure 2:
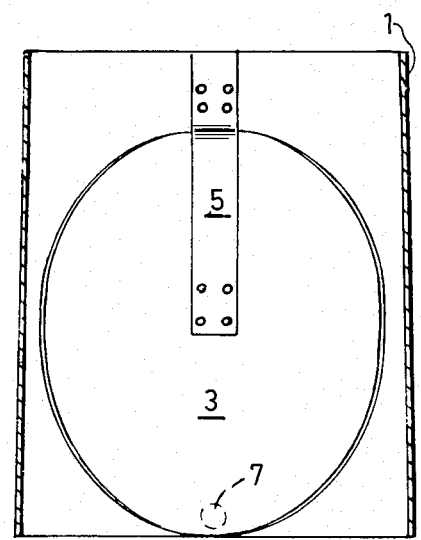
Figure 3:
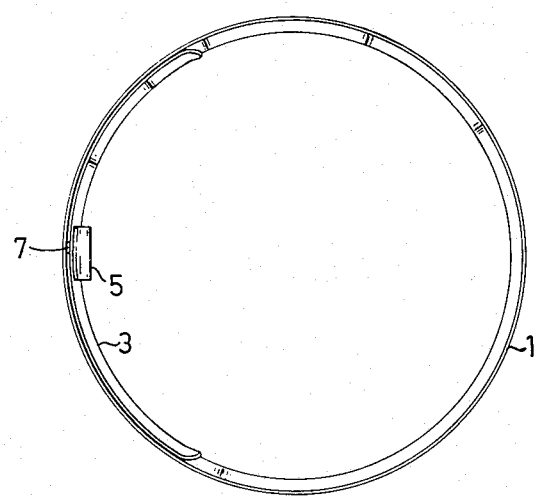

An embodiment of the invention will be described below while referring to the accompanying drawings where FIG. 1 shows an axial section through a fire damper device according to the invention, FIG. 2 shows axial section along the line 11—11 in FIG. 1 and FIG. 3 shows the fire damper device according to FIGS. 1 and 2 as seen from below.

The figures show a sheet metal pipe section 1 with a circular cross-section arranged with suitable connecting means, not shown, to be mounted in the exhaust air canal from a kitchen ventilator. The pipe section 1 can for example be connected directly to the evacuation point in the kitchen wall, at the end shown uppermost in FIGS. 1 and 2, while the opposite end of the pipe section is connected to the kitchen ventilator by a flexible hose.

A valve flap 3 similarly made from sheet metal is placed in the pipe section 1. As may be seen from the figures the flap 3 is generally shaped ovally, seen in projection at right angles to the axis of the pipe section. The flap 3 is however bent into an arcuate shape having a greater radius then the radius of the pipe section, and is therefore maintained pretensioned in the position shown in the figures. In this position, the flap is fixed in two places, one at the upper and one at the lower end of the flap. Upwardly the flap 3 is attached to the wall of the pipe section 1 by means of a flat spring 5, the one end of which is attached to the pipe wall above the flap 3 by spot welding, the other end being spot welded to the flap 3. Downwardly the flap 3 is fastended to the pipe wall 1 by a fastening means made as a melting fuse, which in the present example is done as a blob of solder 7. The solder must have a low enough melting point so that it melts when hot fire gases pass through the pipe section 1.

In the inactive position of the flap 3, shown in FIG. 1 by full lines, both the flap itself and the flat spring 5 are pretensioned, and the flap 3 is maintained in this inactive position by the solder blob 7. If hot gases from a fire were to flow through the canal, the blob of solder 7 would melt, whereon the flap 3 under the force from the flat spring 5, and also of its own pretensioning to begin with, is swung to the position shown by dotted lines in FIG. 1, in which the edge of the flap remote from the spring comes into engagement with the opposite wall of the pipe section 1. Especially when the flap 3 is manufactured from a thin metal sheet, it is suitable to fold the edges of the flap slightly inwards at about half the height of the flap so that they do not grip and fasten onto the walls of the pipe section, which could cause the flap not to move into the closed position in spite of the blob of solder 7 having melted. The shape of the flap is such that in its closed position it blocks off substantially the whole of the flow area of the pipe section 1. As may be seen from FIG. 1, the flap is in contact with its lower edge against the wall of the pipe section, the opposite side of the flap at the spring also closely following the pipe wall. By giving them a suitable shape, the side edges of the flap can be brought closely to follow the corresponding portions of the pipe section 1 wall. Sealing at the side edges is further improved by the flap flexing outwardly from its inactive position to a more planar shape with an increased width.

As may be seen from the drawing, the pipe section is not cylindrical but slightly tapering, confusion as to the direction of the pipe section on assembly hereby being circumvented. This is essential, since the damper device is like a spring-loaded non-return valve in its function. When assembled the right way round and with released flap, the lower edge of the flap lies against the pipe wall opposite the spring 5. Gas pressure from below presses the flap even harder against the pipe wall functioning as a stop. When assembled the wrong way round, only the force of spring 5 could oppose the gas pressure from below, and this closing force would be insufficient. It is furthermore suitable to mark the pipe section externally, e.g., with an arrow giving the flow direction of the air.

The invention is not limited to the embodiment described above and shown in the drawing. For example, the pipe section can be square or have a cross section other than a circular one shown. The flat spring can be bent and attached in another way, e.g. in a U-shape between the pipe wall and the flap, but the embodiment shown has been found to give very small flow resistance. Alternatively, a spring other than a flat spring can be used, and the attachment means made as a melting fuse can have a form other than that of a blob of solder.

We claim:

1. A fire damper device for an air duct such as an evacuation duct from a kitchen, arranged automatically to close the duct when hot gases flow through the duct, comprising a pipe section, a valve flap movable in the pipe section between an open position, in which the valve flap lies adjacent and conforms to the inner contour of the pipe section, and a closed position, in which the valve flap closes substantially the entire area of the pipe section, the axial dimension of the valve flap in its open position being greater than the transverse dismension of the pipe section that in its closed position, the valve flap assumes an oblique position in the pipe section with its edges forming a direct seal with the pipe section walls, a flat elongated leaf spring having one end attached to the valve flap and extending over the edge thereof in the flow direction through the duct, the opposite end of the leaf spring being attached to the pipe section wall downstream of the valve flap, a fastening compound located between the valve flap and the wall of the pipe section and attaching the upstream portion of the valve flap directly to the pipe wall, the fastening compound being heat responsive so as to melt and release the valve flap in the presence of hot gases in the duct, and the leaf spring being pretensioned in its flat position to assume a bent position so that upon release of the valve flap by the fastening compound, the spring bends and moves the valve flap from its open to its closed position.

2. A device according to claim 1, wherein the leaf spring is attached to the side of the valve flap facing the center of the pipe section.

3. A device according to claim 1, wherein the pipe section is substantially circular in cross section, the valve flap in its open position being arcuate to conform with the pipe section wall and being substantially oval with the major axis of the oval being in the direction of the axis of the pipe.

4. A device according to claim 3, wherein the valve flap is made from sheet metal and bent to assume in a free state a radius of curvature greater than the radius of curvature of the pipe section, the valve flap being forced to bend further when moved to its open position so that the valve flap assumes pretensioned condition in its open position.

5. A device according to claim 4, wherein the side edges of the valve flap are rounded off or folded with a lesser radius of curvature than the remainder of the valve flap, so as to stand clear of the pipe wall when the valve flap assumes its open position.

6. A device according to claim 5, characterized in that the fastening compound comprises a blob of solder, attaching the flap directly to the pipe wall.

* * * * *